US009104939B2

(12) United States Patent
Seyfried et al.

(10) Patent No.: US 9,104,939 B2
(45) Date of Patent: Aug. 11, 2015

(54) EMERGENCY RESCUE VEHICLE VIDEO BASED VIOLATION ENFORCEMENT METHOD AND SYSTEM

(71) Applicant: Xerox Corporation, Norwalk, CT (US)

(72) Inventors: Richard W. Seyfried, Williamson, NY (US); Aaron Michael Burry, Ontario, NY (US); Vladimir Kozitsky, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 208 days.

(21) Appl. No.: 13/715,041

(22) Filed: Dec. 14, 2012

(65) Prior Publication Data

US 2014/0169633 A1 Jun. 19, 2014

(51) Int. Cl.
G06K 9/00 (2006.01)
G06K 9/32 (2006.01)

(52) U.S. Cl.
CPC .......... *G06K 9/3258* (2013.01); *G06K 9/00791* (2013.01); *G06K 2209/15* (2013.01)

(58) Field of Classification Search
None
See application file for complete search history.

(56) References Cited

U.S. PATENT DOCUMENTS

| | | | |
|---|---|---|---|
| 4,817,166 A * | 3/1989 | Gonzalez et al. | 382/105 |
| 6,295,387 B1 | 9/2001 | Burch | |
| 6,351,574 B1 | 2/2002 | Yair et al. | |
| 6,392,564 B1 * | 5/2002 | Mackey et al. | 340/937 |
| 6,526,335 B1 * | 2/2003 | Treyz et al. | 701/1 |
| 6,914,541 B1 * | 7/2005 | Zierden | 340/937 |
| 6,940,422 B1 | 9/2005 | Bachelder et al. | |
| 7,095,892 B2 | 8/2006 | Lee et al. | |
| 7,113,108 B1 | 9/2006 | Bachelder et al. | |
| 7,248,149 B2 | 7/2007 | Bachelder et al. | |
| 7,382,280 B2 | 6/2008 | Long | |
| 7,504,965 B1 | 3/2009 | Windover et al. | |
| 7,711,150 B2 | 5/2010 | Simon | |
| 8,159,368 B2 | 4/2012 | Kirkpatrick | |
| 2005/0116838 A1 * | 6/2005 | Bachelder et al. | 340/937 |
| 2007/0216520 A1 * | 9/2007 | Ho | 340/435 |
| 2008/0031522 A1 | 2/2008 | Axemo et al. | |
| 2008/0061953 A1 * | 3/2008 | Bhogal et al. | 340/435 |
| 2008/0118110 A1 | 5/2008 | Simonsson | |
| 2009/0147996 A1 * | 6/2009 | Peng | 382/106 |
| 2009/0195651 A1 | 8/2009 | Leonard et al. | |
| 2009/0208060 A1 | 8/2009 | Wang et al. | |
| 2010/0052947 A1 | 3/2010 | Lin et al. | |
| 2010/0302371 A1 * | 12/2010 | Abrams | 348/149 |
| 2012/0148105 A1 | 6/2012 | Burry et al. | |
| 2012/0155712 A1 | 6/2012 | Paul et al. | |
| 2012/0194353 A1 | 8/2012 | Groves | |

(Continued)

OTHER PUBLICATIONS

"Lookup Table." Wikipedia. Wikimedia Foundation, Oct. 4, 2011. Web. Nov. 14, 2014.*

(Continued)

*Primary Examiner* — Chan Park
*Assistant Examiner* — Geoffrey E Summers
(74) *Attorney, Agent, or Firm* — Fay Sharpe LLP

(57) ABSTRACT

Disclosed are methods and systems for monitoring and reporting road violations of vehicles sharing roads with responding emergency vehicles. According to an exemplary method video is captured from a forward and/or rear facing camera mounted to an emergency vehicle, and the video is processed to identify any vehicles in violation within a prescribed distance from the emergency vehicle. A license plate id of a vehicle determined to be in violation is identified and communicated to the appropriate authorities.

12 Claims, 10 Drawing Sheets

(56) References Cited

U.S. PATENT DOCUMENTS

2012/0263352 A1 10/2012 Fan et al.
2012/0269398 A1 10/2012 Fan et al.

OTHER PUBLICATIONS

"New York State Law." Article 26. New York State Law, Jun. 22, 2006. Web. Nov. 13, 2014.*
U.S. Appl. No. 13/210,447, filed Aug. 16, 2011, Burry et al.

* cited by examiner

EMERGENCY RESCUE VEHICLE VIDEO BASED VIOLATION ENFORCEMENT METHOD AND SYSTEM

CROSS REFERENCE TO RELATED PATENTS AND APPLICATIONS patent application Ser. No. 13/210,447, filed Aug. 16, 2011 by Aaron M. Burry et al. and entitled "AUTOMATED PROCESSING METHOD FOR BUS CROSSING ENFORCEMENT" is incorporated herein by reference in its entirety.

BACKGROUND

This disclosure provides methods and systems for monitoring and reporting road violations of vehicles sharing roads with responding emergency vehicles. Specifically, this disclosure addresses enforcement issues related to an emergency vehicle, such as an ambulance, driving to a medical call. When an ambulance is dispatched and is racing above the posted speed limit to a medical emergency such as a level 3, Code 300 and above, as specified under New York law, people who are driving ahead of the ambulance should pull over to the side of the road. Vehicles coming in the opposite direction should also move out of the way, yielding to the emergency right-of-way demands of the ambulance. These actions are dictated by driving laws of the state, and are mentioned in the driving hand book handed out when one obtains a leaner's permit prescribing a driver to yield to emergency vehicles. Unfortunately, some drivers do NOT move out of the way of an ambulance with its horn, siren and emergency lights on. Time wasted getting to a medical emergency can put an injured person in a life threatening position. Notably, the disclosed methods and systems are also applicable to ALS (Advance life support) vehicles also known as fly cars. ALS vehicles are the medical right arm for some cities and outlining areas since cost prohibits every town from having an ambulance program including a state licensed medical paramedic on staff.

The difficulty associated with enforcement of yielding to emergency vehicles is that a police officer typically must be present to witness the event, and it is very difficult for an emergency vehicle driver to be able to maneuver his/her vehicle while attempting to notify the authorities of a non-yielding vehicle or even to write down the violator's plate for later reference. In addition, there is the issue of evidence related to the no-yielding event in a court proceeding. The issues with enforcement for emergency vehicles are in fact quite similar to those associated with people running red lights. In recent years, there has been a growth in automated enforcement of red lights using cameras at intersections. In addition, co-pending patent application Ser. No. 13/210,447 discloses technology for placing cameras on the side of school buses for automated processing of "passing a stopped school bus" violations. The present disclosure addresses the issue of enforcement of the requirement to yield to emergency vehicles using an automated/camera-based approach.

INCORPORATION BY REFERENCE

New Vehicle and Traffic Law effective Aug. 30, 2010; Section 1180 (Speeding) Article; Wayne County Sheriff; Barry Virts with permission from: Wilma Young, Editor, The Sun & Record: 127$^{th}$ Year—No. 35; Oct. 7, 2010. Sun & Record Publications, 4287 Jersey Road, P.O. Box 31, Williamson, N.Y. 14589, official publication, public record; and U.S. patent application Ser. No. 13/210,447 by Burry et al., filed Aug. 16, 2011 and entitled "AUTOMATED PROCESSING METHOD FOR BUS CROSSING ENFORCEMENT," are incorporated herein by reference in their entirety.

BRIEF DESCRIPTION

In one embodiment of this disclosure, described is a computer-implemented method of detecting a vehicle that fails to yield to an emergency vehicle traveling on a section of road, the method comprising A) receiving a video stream from a forward facing image capturing device mounted to an emergency vehicle, the video stream including a plurality of temporally spaced video frames; B) processing the video stream to identify two or more video frames including a detected vehicle within a prescribed distance in a front of the emergency vehicle; and C) processing the identified two or more video frames to determine if the detected vehicle is yielding to the emergency vehicle according to a prescribed law, the prescribed law requiring the detected vehicle to yield a right of way to the emergency vehicle within the prescribed distance by moving the detected vehicle to a prescribed side of the section of road and stopping on the prescribed side of the section of road.

In another embodiment of this disclosure, described is a system that facilitates detecting a vehicle that fails to yield to an emergency vehicle, the system comprising a forward facing image capturing device mounted to an emergency vehicle, the forward facing image capturing device configured to provide a video stream of an area in a front of the emergency vehicle, the video stream including a plurality of temporally spaced video frames; a processor operatively connected to the forward facing image capturing device, the processor configured to execute stored computer-executable instructions for A) receiving the video stream from the forward facing image capturing device, the video stream including a plurality of temporally spaced video frames; B) processing the video stream to identify two or more video frames including a detected vehicle within a prescribed distance of road in a front of the emergency vehicle; and C) processing the identified two or more video frames to determine if the detected vehicle is yielding to the emergency vehicle compliance according to a prescribed law, the prescribed law requiring the detected vehicle to yield a right of way to the emergency vehicle within the predetermined distance by moving the detected vehicle to a prescribed side of the section of road and stopping on the prescribed side of the section of road.

In still another embodiment of this disclosure, described is a computer-implemented method of detecting a vehicle that follows an emergency vehicle too close on a section of road, the method comprising A) receiving a video stream from a rear facing image capturing device mounted to an emergency vehicle, the video stream including a plurality of temporally spaced video frames; B) processing the video stream to identify two or more video frames including a detected vehicle within a prescribed distance in a rear of the emergency vehicle; and C) processing the identified two or more video frames to determine if the detected vehicle is following the emergency vehicle in violation of a prescribed law, the prescribed law requiring the detected vehicle to not follow the emergency vehicle at a distance closer than the prescribed distance in the rear of the emergency vehicle.

In yet another embodiment of this disclosure, described is a system that facilitates detecting a vehicle that follows an emergency vehicle too close on a section of road, the system comprising a rear facing image capturing device mounted to an emergency vehicle, the rear facing image capturing device configured to provide a video stream of an area in a rear of the emergency vehicle, the video stream including a plurality of temporally spaced video frames; a processor operatively connected to the rear facing image capturing device, the processor configured to execute stored computer-executable instructions for A) receiving the video stream from the rear facing image capturing device, the video stream including a plurality of temporally spaced video frames; B) processing the video stream to identify two or more video streams including a detected vehicle within a prescribed distance in the rear of the emergency vehicle; and C) processing the identified two or more video frames to determine if the detected vehicle is following the emergency vehicle in violation of a prescribed law, the prescribed law requiring the detected vehicle to not follow the emergency vehicle at a distance closer than the prescribed distance in the rear of the emergency vehicle.

DETAILED DESCRIPTION

Figure 1:
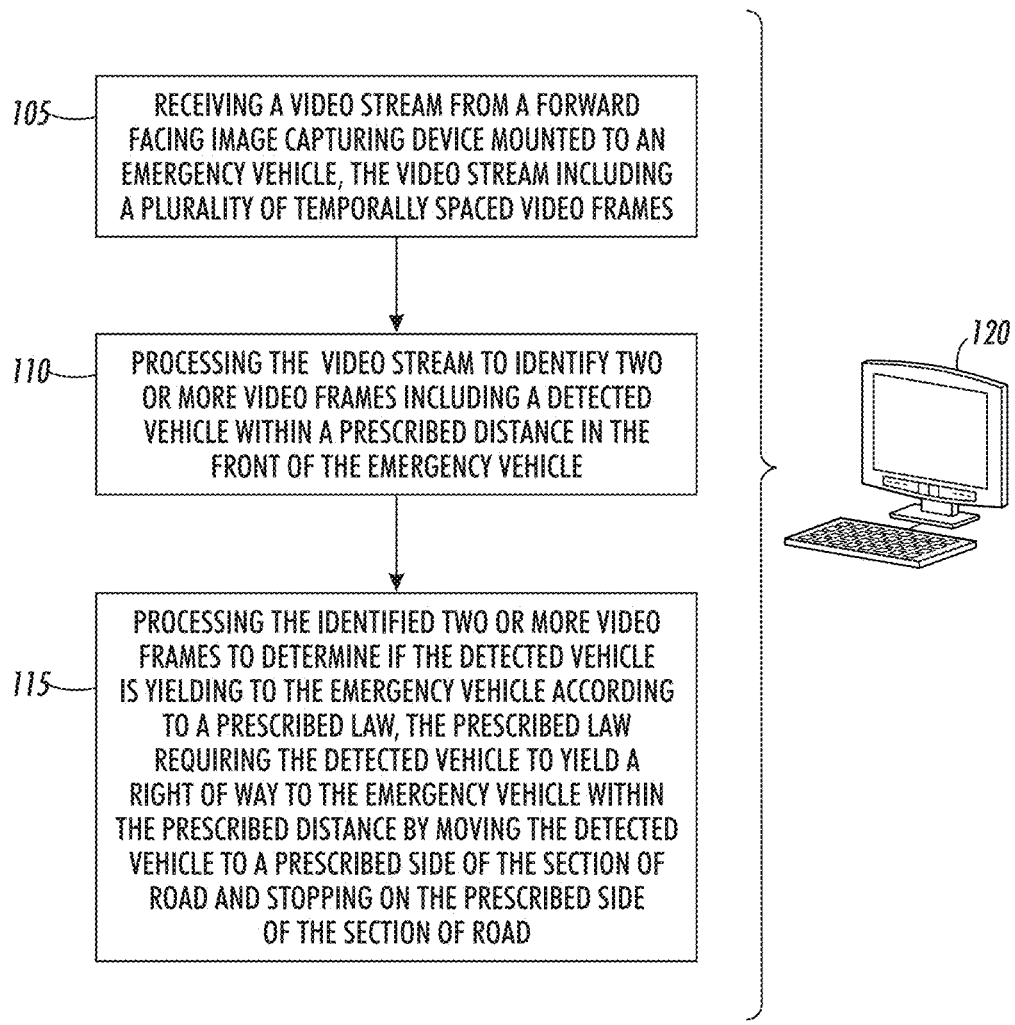
FIG. 1 is a flow chart of a computer-implemented method of detecting a vehicle that fails to yield to an emergency vehicle according to an exemplary embodiment of this disclosure, the emergency vehicle including a mounted forward-facing image capturing device.

This disclosure provides methods and systems for monitoring and reporting road violations of vehicles sharing roads with responding emergency vehicles.

As discussed in the Background section, this disclosure addresses the enforcement of the requirement to yield to emergency vehicles by mounting cameras on board emergency vehicles, such as ambulances, ALS fly cars, fire trucks, and any other emergency vehicles that responds to a 911 call for help. Enforcing and ticketing problematic drivers that refuse to yield to the emergency vehicle as prescribed by law can be difficult. One would typically need to have a police officer at the right moment to observe the offence to handle the situation and ticket the driver. An ambulance/ALS crew could call in the information to the 911 center, however, when on a call and driving to the scene and/or trauma centers, the crewmen are very busy looking out for other drivers, pedestrians and receiving and giving updates to the 911 command and trauma centers. The disclosed forward and rear facing camera systems mounted on an emergency vehicle captures images and/or video of the violators and records vehicle descriptions and license plate numbers for further action after the emergency call has been cleared. The disclosed method and system are also helpful in recording an incident/accident which happened while on a call to assist in determining fault in subsequent court proceedings.

The present disclosed methods and systems provide two configurations differentiated by the positioning of the image capturing device/video camera; forward or rear facing.

The first configuration involves using a forward facing video camera mounted on the emergency vehicle which is focused on giving rescue service personnel a tool to assist law enforcement with the detection and identification of drivers not yielding to emergency vehicles while on a call for help. Too often rescue vehicles are hindered by drivers not moving to the side of the road or not yielding the right of way and reducing response time in critical care situations.

By way of example, New York traffic law article 1144 states the following:

"Upon the immediate approach of an authorized emergency vehicle equipped with at least one lighted lamp exhibiting red light visible under normal atmospheric conditions from a distance of five hundred feet to the front of such vehicle other than a police vehicle or bicycle when operated as an authorized emergency vehicle, and when audible signals are sounded from any said vehicle by siren, exhaust whistle, bell, air-horn or electronic equivalent; the driver of every other vehicle shall yield the right of way and shall immediately drive to a position parallel to, and as close as possible to the right-hand edge or curb of the roadway, or to either edge of a one-way roadway three or more lanes in width, clear of any intersection, and shall stop and remain in such position until the authorized emergency vehicle has passed, unless otherwise directed by a police officer."

According to an exemplary embodiment of this disclosure, the 500 foot distance requirement is established using video data by taking into account the camera field of view and the fixed size of license plates and/or characters on license plates. On install, a camera or image capturing system is calibrated such that the captured license plate border pixel dimensions at various distances are recorded and is used to create a mapping of license plate size to distance of license plate from the camera. To handle cases where license plate covers obscure the boundary of the license plate, character pixel height and widths can also be recorded and used as part of the distance measurement algorithm.

While an emergency vehicle is actively responding to a call, the same actuator that enables the emergency lights and sirens can be used to turn on the video cameras thus avoiding false tagging of violators. The video collected during the live call is either processed on the camera itself in real-time and violator information forwarded to law enforcement, or the video collected is post processed once the emergency vehicle returns to base. The disclosed methods/systems support both of these processes. The recorded video stream is processed using an automatic license plate recognition (ALPR) algorithm locating license plates of vehicles in front of the emergency vehicle.

The size of the located license plates is tracked to ensure that only those vehicles within a 500 foot distance are selected for further processing. The license plates associated with a selected vehicle are tracked over time to determine if the license plate is increasing in size, indicating the vehicle in front is slowing down, or if the license plate size is remaining relatively constant, thereby violating the 500 foot threshold, or some other arbitrary distance as defined by local laws indicating the vehicle is not moving out of the way as prescribed by law.

Further, lane tracking algorithms are used to establish valid lanes in the video stream captured by the image capturing device. Notably, this technology is currently available in high end luxury vehicles that warn the driver if their vehicle is inadvertently leaving the established lane without signaling or actuating the steering wheel. Once the existence and number of lanes is established, further processing is carried out to verify that the adjacent lanes are empty. According to one exemplary embodiment, an algorithm for characterization of road surfaces is performed in conjunction with classification algorithms and the pixel mapping to distance discussed above, is used to verify that the violating vehicle can indeed fit into the opening in the adjacent lane(s).

Details of the detected violations include one or more of the violator's license plate code, time of violation and GPS information, which are recorded for review by a law enforcement officer to verify the violation and used as evidence in any subsequent court proceeding. After a law enforcement officer reviews the violation information, a citation can be sent to the offender for the violation(s). According to one exemplary embodiment, a fee can be applied and money collected, dispersed, in part, to the rescue services, the system provider, city—town—villages and state, etc. Hopefully, the offender will pay more attention in the future and yield to emergency crews.

The second provided configuration includes the usage of a rear facing video camera/image capturing device to record violators who follow an emergency vehicle too closely.

By way of example, NY traffic law article 1217 states the following,

"The driver of any vehicle other than one on official business shall not follow any authorized emergency fire vehicle in the same lane or an adjacent lane to the one being used by such fire vehicle at a distance closer than two hundred feet while such fire vehicle is displaying one or more red or combination red and white lights, or one white light which must be a revolving, rotating, flashing, oscillating or constantly moving light, nor shall such driver drive into or park his or vehicle within the block or where there is no block, within one thousand feet of where such fire vehicle has stopped in answer to a fire alarm."

According to one exemplary embodiment of this disclosure, the 200 foot distance requirement is enforced using video data by taking into account the camera field of view and the fixed size of license plates and/or characters on license plates. On install, the camera/image capturing system is calibrated such that the license plate pixel dimensions at various distances are recorded, which are used to create a mapping of license plate size to the distance of the license plate from the camera/image capturing device. To handle cases where license plate covers obscure the boundary of the license plate, character pixel height and widths can also be recorded and used as part of the distance measurement algorithm.

While the emergency vehicle is actively responding to a call, according to one exemplary embodiment, the actuator that enables the emergency lights and sirens is also used to turn on the rear facing video camera(s), thus avoiding false tagging of violators. The video collected during the live call can either be processed on the camera itself in real-time and violator information forwarded to law enforcement, or it can be post processed once the emergency vehicle returns to base. The disclosed methods/systems support both of these processes. When the video is recording during a live call, an automatic license plate recognition (ALPR) algorithm is executed on the video stream locating license plates of vehicles following the emergency vehicle. The size of the located license plates is tracked over time to determine if they are decreasing in size, indicating the following vehicle is slowing down, or if the license plate size remains relatively constant, indicating the vehicle is violating the 200 foot threshold, or some arbitrary distance as defined by local laws. Details recorded of the violations include one or more of the violator's license plate code, time of violation and GPS information, which are provided for review by a law enforcement officer to verify the violation and used as evidence in subsequent court proceedings, if required.

Existing technology for automated license plate recognition (ALPR) and video analysis for school bus crossing enforcement as disclosed in copending patent application Ser. No. 13/210,447, can be integrated into the disclosed camera system for an emergency response vehicle—automatically detecting from the video stream when a vehicle is refusing to yield, recording a video snippet associated with the detected violation, and then automatically extracting the license plate state and ID for enforcement processing. This type of automation has the following benefits:

It does not require the emergency response driver, who is already quite busy navigating to the scene of the emergency or to a trauma center, to record information about violations or to notify the police of an offence.

It also realizes a significant time and resource savings in the "back office" processing required to go from evidence to a issued ticket. Even though most jurisdictions still require a police officer to review the evidence and issue a ticket based on the reviewed evidence, automatically extracting only the video sequence including the violation and extracting the license plate state and ID from the images/video still can provide a significant improvement in efficiency.

With reference to FIG. 1, illustrated is a flow chart of an exemplary embodiment of a computer-implemented method of detecting a vehicle that fails to yield to an emergency vehicle.

A computer 120 can be employed as one possible hardware configuration to support the systems and methods described herein. It is to be appreciated that although a standalone architecture is illustrated, any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

The computer 120 can include a processing unit (not shown) that executes, and a system memory (not shown) that stores, one or more sets of computer-executable instructions (e.g., modules, programs, routines, algorithms, etc.) for performing the various functions, procedures, methods, protocols, techniques, etc., described herein. The computer can further include a system bus (not shown) that couples various system components including the system memory to the processing unit. The processing unit can be any of various commercially available processors. Dual microprocessors and other multi-processor architectures also can be used as the processing unit.

As used herein, "module" refers to a set of computer-executable instructions (e.g., a routine, program, algorithm, application, etc., persistently stored on a computer-readable medium (e.g., a memory, hard drive, disk, flash drive, or any other suitable storage medium). Moreover, the steps of the methods described herein are executed by a computer unless otherwise specified as being performed by a user.

The computer 120 typically includes at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above can also be included within the scope of computer readable media.

A user may enter commands and information into the computer through a keyboard (not shown), a pointing device (not shown), a mouse, thumb pad, voice input, stylus, touchscreen, etc. The computer 120 can operate in a networked environment using logical and/or physical connections to one or more remote computers, such as a remote computer(s). The logical connections depicted include a local area network (LAN) and a wide area network (WAN). Such networking environments are commonplace in offices, enterprise-wide computer networks, intranets and the Internet.

With continuing reference to FIG. 1, the vehicle detection method operates as follows:

Initially, at block 105 the system receives a video stream from a forward facing image capturing device mounted to an emergency vehicle, the video stream including a plurality of temporally spaced video frames.

Next, at block 110, the system processes the video stream to identify two or more video frames including a detected vehicle within a prescribed distance in a front of the emergency vehicle.

Finally, at block 115, the system processes the identified two or more video frames to determine if the detected vehicle is yielding to the emergency vehicle according to a prescribed law, the prescribed law requiring the detected vehicle to yield a right of way to the emergency vehicle within the prescribed distance by moving the detected vehicle to a prescribed side of the section of road and stopping on the prescribed side of the section of road.

Figure 2:
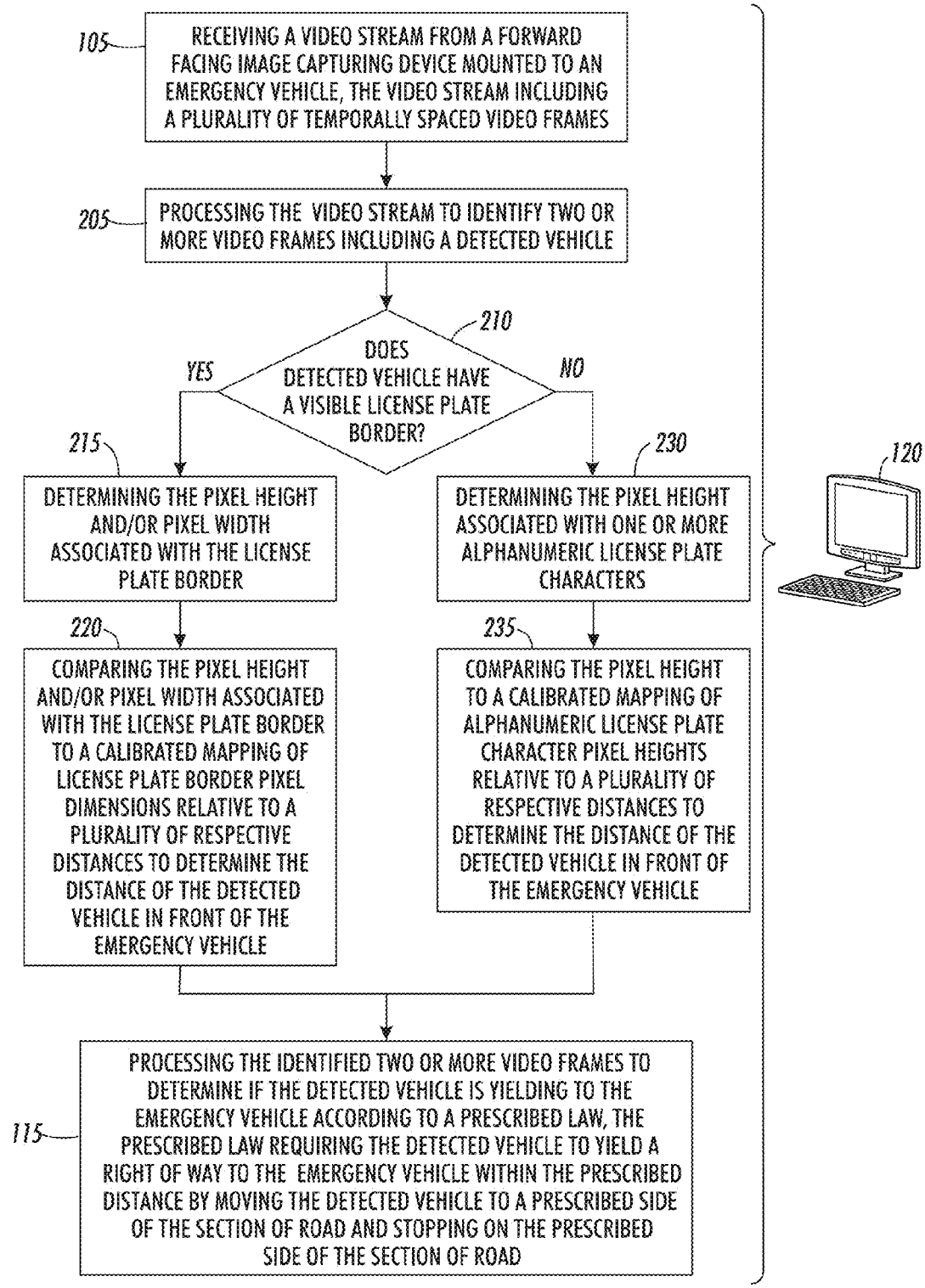
FIG. 2 is a flow chart of a computer-implemented method of detecting a vehicle that fails to yield to an emergency vehicle according to another exemplary embodiment of this disclosure, the emergency vehicle including a mounted forward-facing image capturing device.

FIG. 2 illustrates a flow of an exemplary method of determining distance based on the captured video frames which includes all or part of a license plate.

As previously described with reference to FIG. 1, initially, at block 105, the system receives a video stream from a forward facing image capturing device mounted to an emergency vehicle, the video stream including a plurality of temporally spaced video frames.

Next, at block 205, the system processes the video stream to identify two or more video frames including a detected vehicle.

Next, at block 210, the system determines if the detected vehicle within the video frames includes a completely visible license plate border.

If the license plate border is visible, block 215 determines a pixel height and/or pixel width associated with the license plate border and block 220 compares the pixel height and/or pixel width associated with the license plate border to a calibrated mapping of license plate border pixel dimensions relative to a plurality of respective distances to determine a distance of the detected vehicle in front of the emergency vehicle.

If the license plate border is not visible, block 230 determines a pixel height associated with one or more alphanumeric license plate characters and block 235 compares the pixel height to a calibrated mapping of alphanumeric license plate character pixel heights relative to a plurality of respective distances to determine a distance of the detected vehicle in front of the emergency vehicle.

Finally, at block 115, as previously described with reference to FIG. 1, the system processes the identified two or more video frames to determine if the detected vehicle is yielding to the emergency vehicle according to a prescribed law, the prescribed law requiring the detected vehicle to yield a right of way to the emergency vehicle within the prescribed distance by moving the detected vehicle to a prescribed side of the section of road and stopping on the prescribed side of the section of road.

Figure 3:
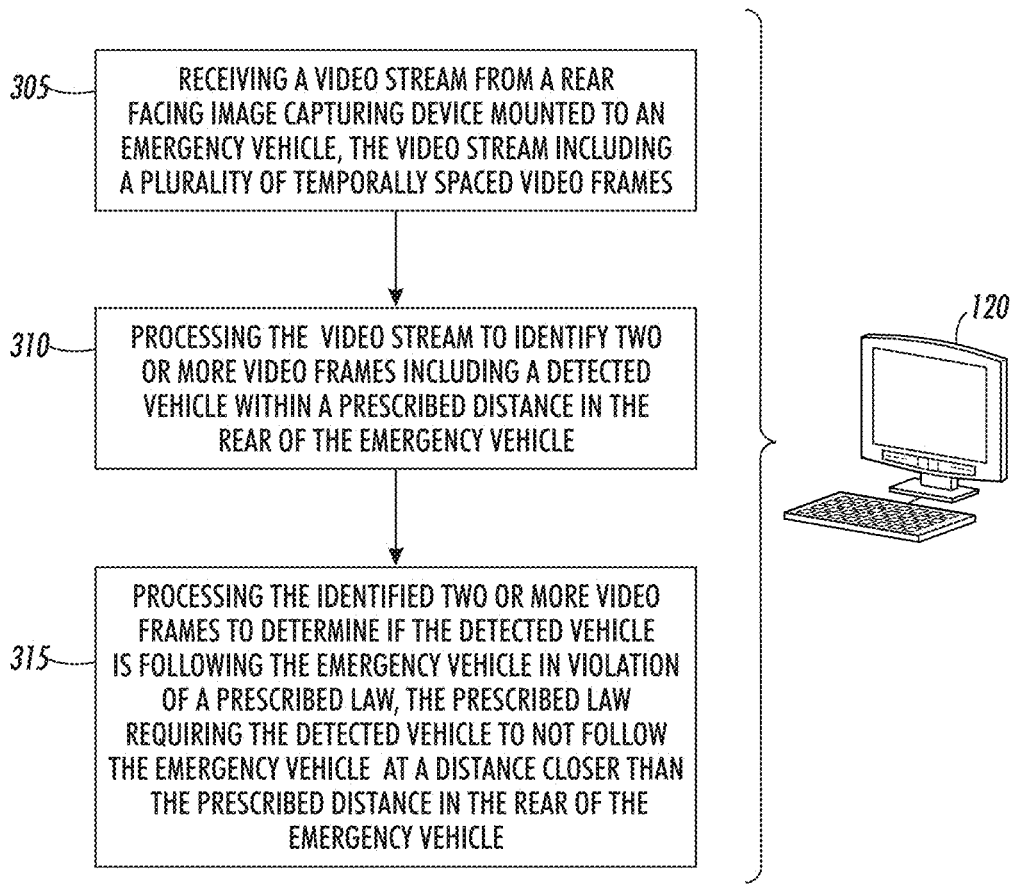
FIG. 3 is a flow chart of a computer-implemented method of detecting a vehicle that follows an emergency vehicle too close according to an exemplary embodiment of this disclosure, the emergency vehicle including a mounted rear facing image capturing device.

With reference to FIG. 3, illustrated is a flow chart of an exemplary embodiment of a computer-implemented method of detecting a vehicle that follows an emergency vehicle too close.

Initially, at block 305, the system receives a video stream from a rear facing image capturing device mounted to an emergency vehicle, the video stream including a plurality of temporally spaced video frames.

Next, at block 310, the system processes the video stream to identify two or more video frames including a detected vehicle within a prescribed distance in a rear of the emergency vehicle.

Finally, at block 315, the system processes the identified two or more video frames to determine if the detected vehicle is following the emergency vehicle in violation of a prescribed law, the prescribed law requiring the detected vehicle to not follow the emergency vehicle at a distance closer than the prescribed distance in the rear of the emergency vehicle.

Figure 4:
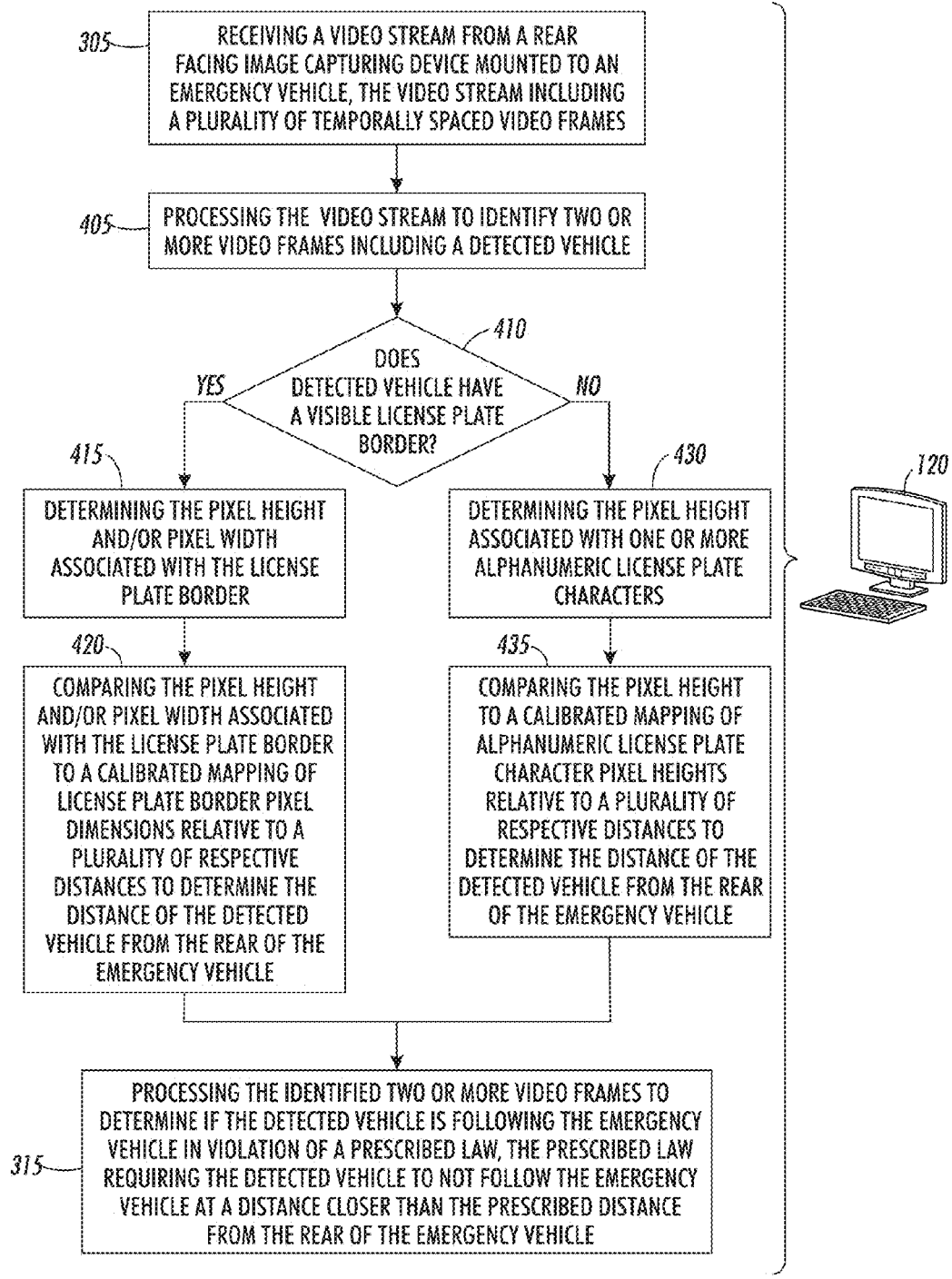
FIG. 4 is a flow chart of a computer-implemented method of detecting a vehicle that follows an emergency vehicle too close according to another exemplary embodiment of this disclosure, the emergency vehicle including a mounted rear facing image capturing device.

FIG. 4 illustrates a flow chart of an exemplary method of determining distance based on the captured video frames which includes all or part of a license plate.

As previously described with reference to FIG. 3, initially, at block 305, the system receives a video stream from a rear facing image capturing device mounted to an emergency vehicle, the video stream including a plurality of temporally spaced video frames.

Next, at block 405, the system processes the video stream to identify two or more video frames including a detected vehicle.

Next, at block 410, the system determines if the detected vehicle within the video frames includes a completely visible license plate border.

If the license plate border is visible, block 415 determines a pixel height and/or pixels width associated with the license plate border and block 420 compares the pixel height and/or pixel width associated with the license plate border to a calibrated mapping of license plate border pixel dimensions relative to a plurality of respective distances to determine a distance of the detected vehicle in rear of the emergency vehicle.

If the license plate border is not visible, block 430 determines a pixel height associated with one or more alphanumeric license plate characters and block 435 compares the pixel height to a calibrated mapping of alphanumeric license plate character pixel heights relative to a plurality of respective distances to determine a distance of the detected vehicle in rear of the emergency vehicle.

Finally, at block 315, as previously described with reference to FIG. 3, the system processes the identified two or more video frames to determine if the detected vehicle is following the emergency vehicle in violation of a prescribed law, the prescribed law requiring the detected vehicle to not follow the emergency vehicle at a distance closer than the prescribed distance in the rear of the emergency vehicle.

Figure 5:
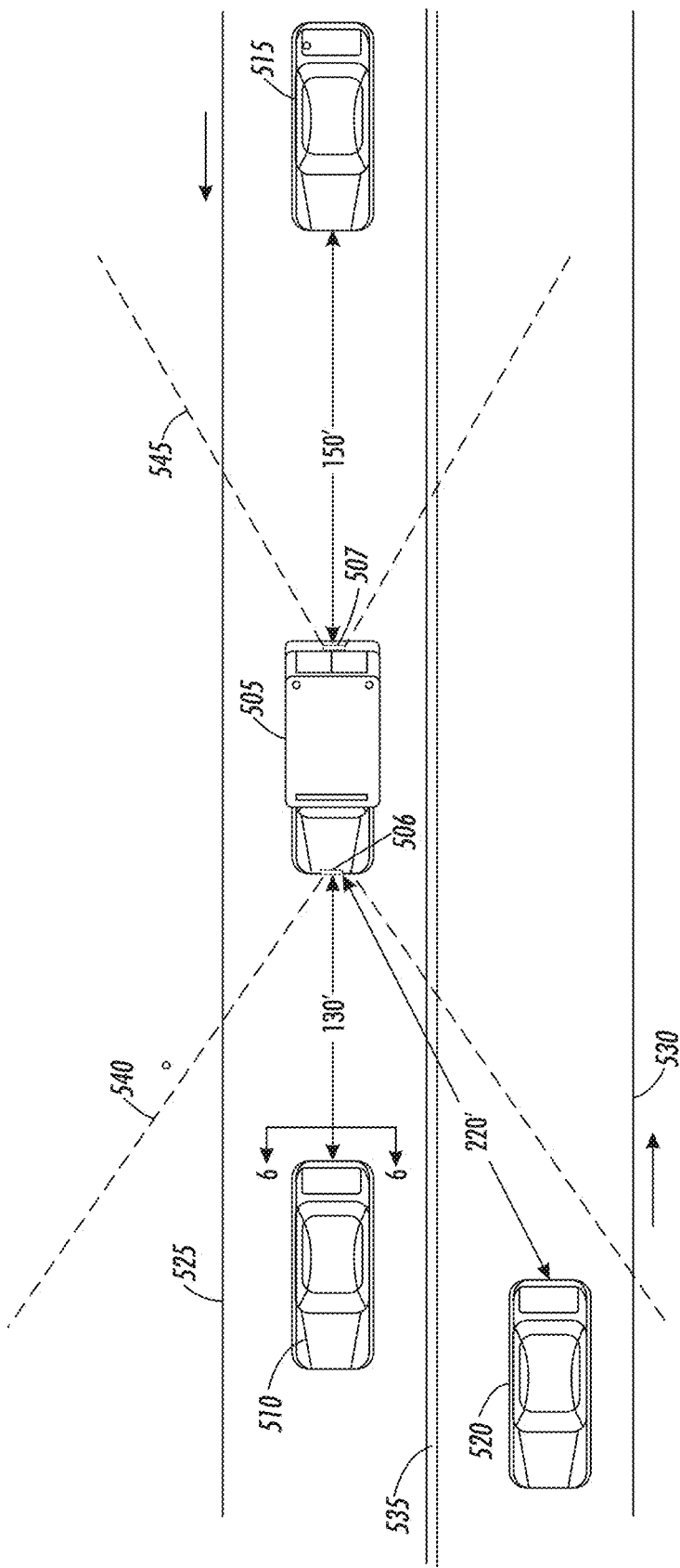
FIG. 5 is a diagram of a system facilitating the detection and identification of a first vehicle that fails to yield to an emergency vehicle and a second vehicle that follows an emergency vehicle too close, according to an exemplary embodiment of this disclosure.

With reference to FIG. 5, illustrated is one emergency vehicle response scenario which includes two vehicles 510 and 520 failing to yield to an emergency vehicle 505 within a 500 foot prescribed distance and a third vehicle 515 which is following the emergency vehicle 505 too close, i.e. within the prescribed distance of 200 feet.

As shown, the system includes a front facing image capturing unit 506 with a field of view 540 and a rear facing image capturing unit 507 with a field of view 545. Field of view 540 and 545 both include lanes 525 and 530 which are separated by a double yellow line 535.

Figure 6:
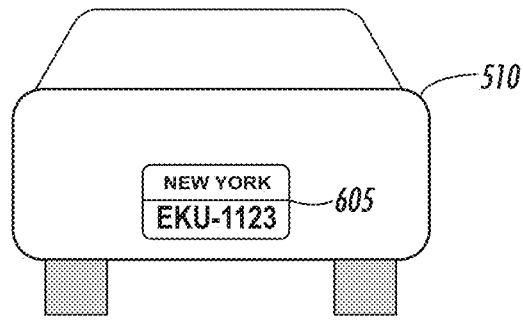
FIG. 6 is a view of a rear of a detected vehicle according to an exemplary embodiment of this disclosure.

As shown in FIG. 6, by way of example, the field of view includes a license plate 605 associated with vehicle 510 as well as the other vehicle which is not shown.

Figure 7:
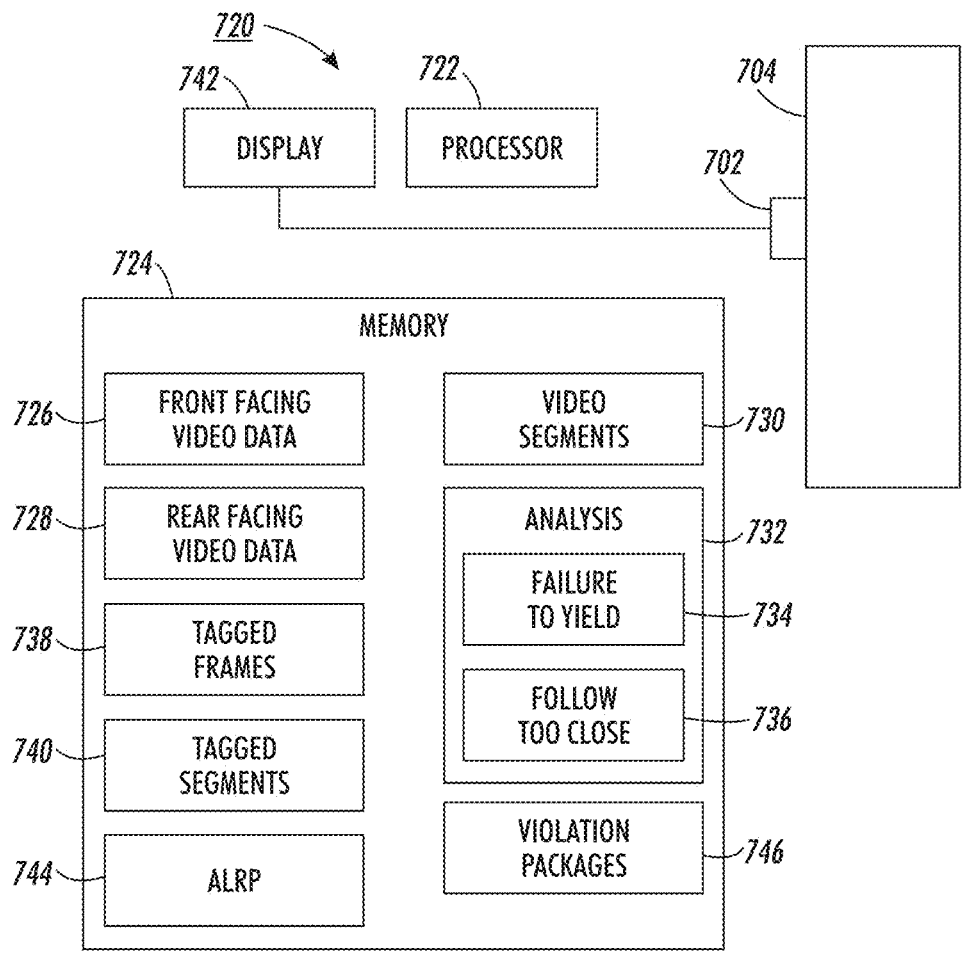
FIG. 7 is a block diagram of a system that facilitates the detection and identification of a vehicle that fails to yield to an emergency vehicle or a vehicle that follows an emergency vehicle too close, according to an exemplary embodiment of this disclosure.
Figure 8:
FIG. 8 is a cropped image of a license plate 30 feet from a 250 mm camera lens, providing 431 pixel high characters.
Figure 9:
FIG. 9 is a cropped image of a license plate 66 feet from a 250 mm camera lens, providing 209 pixel high characters.
Figure 10:
FIG. 10 is a cropped image of a license plate 100 feet from a 250 mm camera lens, providing 126 pixel high characters.
Figure 11:
FIG. 11 is a cropped image of a license plate 150 feet from a 250 mm camera lens, providing 83 pixel high characters.
Figure 12:
FIG. 12 is a cropped image of a license plate 200 feet from a 250 mm camera lens, providing 62 pixel high characters.
Figure 13:
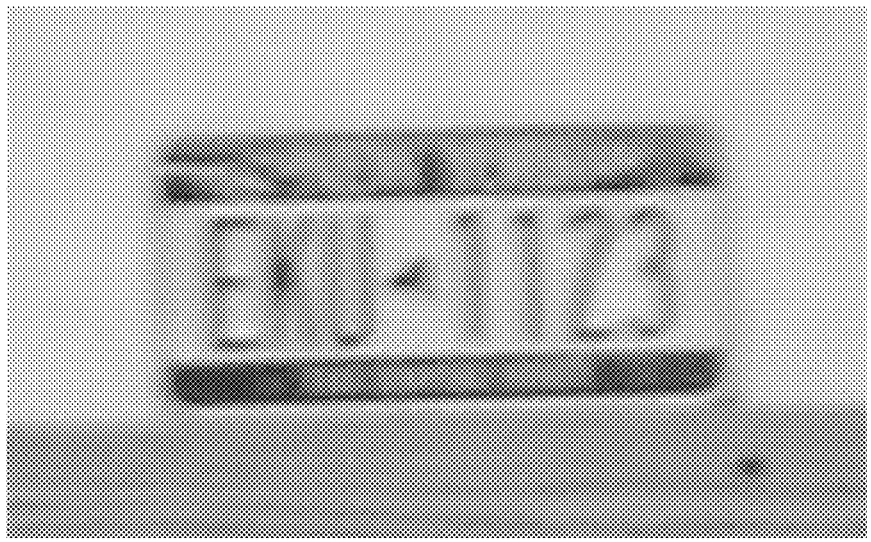
FIG. 13 is a cropped image of a license plate 290 feet from a 250 mm camera lens, providing 41 pixel high characters.
Figure 14:
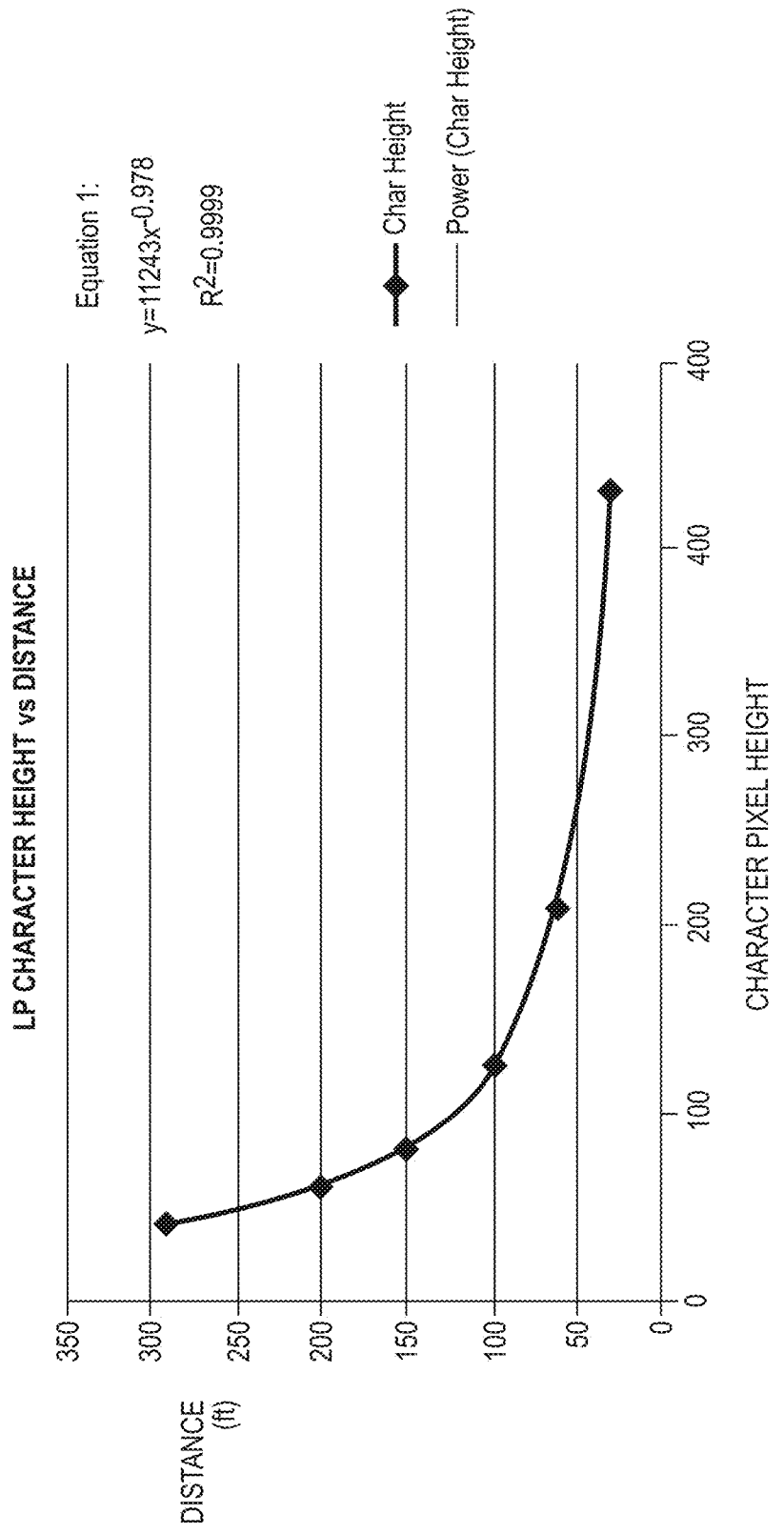
FIG. 14 is a graph of the results of FIGS. 8-12 indicating license plate character height versus distance.

FIG. 7 illustrates another system that facilitates detecting and identifying moving vehicles that fail to yield to an emergency or a vehicle that follows an emergency vehicle too close, in accordance with various aspects described herein. The system 120 includes a forward facing and a rear facing camera device 702, which are mounted on an emergency vehicle 704. The system also includes a processor 722 that executes, and a memory 724 that stores, computer-executable instructions or "modules" for carrying out the various functions described herein. In one embodiment, the processor 722 and memory 724 reside in a computer that is remote from the camera device. Acquired video data is retrieved from the camera device wirelessly (e.g., over a suitable wireless connection) or over a wired connection (e.g., a technician or law enforcement office connects the computer or a storage device such as a memory stick to the camera devices and downloads the video data 726 and 728, which is then stored in the memory of the computer). In another embodiment, the processor and memory are integral to the camera devices and the here-in describe functionality is performed at the camera devices.

Video data recorded by the camera device is stored in the memory. The video data is recorded continuously during an emergency run by an emergency vehicle or periodically (e.g., when the siren on the top of the emergency vehicle is on). The processor executes a partitioning module (i.e., a set of computer-executable instructions) that partitions the video data into video segments 730. Each segment corresponds to an emergency run, and comprises a plurality of video image frames taken from the initial actuation of the emergency lights and siren until the deactivation of the emergency lights and siren. The processor executes an analysis module 732 that analyzes the video segments to detect or identify moving vehicles that illegally fail to yield to the emergency vehicle 734 and/or follow the emergency vehicle too closely 736. The analysis module 732 includes a license plate analysis module that is executed by the processor to perform the method described with regard to FIGS. 2 and 4. Using the license plate analysis module, the processor identifies video frames that show a vehicle illegally failing to yield to the emergency vehicle and/or following the emergency vehicle too close. The tagged frames 738 are stored in the memory, and the processor additionally tags and stores tagged video segments 740 that include the tagged frames. In one embodiment, the tagged segments are presented on a display 742 for review by a human technician such as emergency personnel or law enforcement personnel, and may be used to identify and penalize the driver or owner of the vehicle that committed the violation.

In another embodiment, once the segments of the video sequences with violations have been identified and tagged, images of the license plates for each of the violating vehicles are identified and extracted. For instance, the processor executes an automated license plate recognition (ALPR) module 744 that identifies the license plate number of vehicles and the state of origin, in order to mitigate or minimize human review. This feature provides an end-to-end solution for automating the violation detection and processing. The plate numbers and state of origin information can be embedded in the video segment data (e.g., as metadata), included in a header or title for the tagged video segment, and/or otherwise associated with or appended to the tagged segment(s) to create a "violation package" 746 that can be sent to or directly downloaded by local law enforcement. This feature enables a human reviewer to quickly identify the license plate text and state of origin such that the appropriate vehicle and/or operator can be ticketed.

With reference to FIGS. 8-14, provided are the results of an experiment determining LP (license plate) character height versus distance.

Given a camera system with a fixed focal length, the distance of vehicles from the camera can be calculated following a calibration procedure. The calibration procedure is outlined below and a best fit line is generated yielding an equation that converts the pixel height of characters on a license plate to actual distance of the license plate from the camera.

An experiment was conducted in a hallway using a camera fitted with a 250 mm lens. A license plate was mounted on a far wall and the actual distance of license plate from the camera was measured using a ranging instrument. Color images and distance measurements were taken at 30, 60, 100, 150, 200, and 290 feet. The actual cropped images of the license plate are shown in FIGS. 8-13, respectively.

For each distance, the license plate was cropped out of the image (located in the image) and the height in pixels of each character was recorded. An average character height was used to generate FIG. 13. A best fit line through this data models the power distribution and is recorded as Equation 1. The equation fits the data really well with an R-squared of 0.999 thus showing that for a given character height, the distance can be determined.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented method of detecting a vehicle that fails to yield to an emergency vehicle traveling on a section of road and detecting a vehicle that follows an emergency vehicle too close on the section of road, the method comprising:

A) receiving a first video stream from a forward facing image capturing device mounted to an emergency vehicle, the first video stream including a first plurality of temporally spaced video frames;

B) processing the first video stream to identify a first set of two or more video frames including a first detected vehicle within a first prescribed distance in a front of the emergency vehicle;

C) processing the identified first set of two or more video frames to determine if the first detected vehicle is yielding to the emergency vehicle according to a first prescribed law, the first prescribed law requiring the first detected vehicle to yield a right of way to the emergency vehicle within the first prescribed distance by moving the first detected vehicle to a prescribed side of a section of road and stopping on the prescribed side of the section of road;

D) receiving a second video stream from a rear facing image capturing device mounted to an emergency vehicle, the second video stream including a second plurality of temporally spaced video frames;

E) processing the second video stream to identify a second set of two or more video frames including a second detected vehicle within a second prescribed distance in a rear of the emergency vehicle; and F) processing the identified second set of two or more video frames to determine if the second detected vehicle is following the emergency vehicle in violation of a second prescribed law, the second prescribed law requiring the second detected vehicle to not follow the emergency vehicle at a distance closer than the second prescribed distance in the rear of the emergency vehicle, wherein the first set of two or more video frames includes a license plate associated with the first detected vehicle, the license plate including a height and width, and step B) comprises:

determining if the first detected vehicle is within the first prescribed distance by determining one or both of a pixel height and a pixel width associated with the license plate.

2. The computer-implemented method of detecting a vehicle according to claim 1, further comprising:
   if the first detected vehicle is in violation of the first prescribed law, identifying a license plate mounted to the detected vehicle.

3. The computer-implemented method of detecting a vehicle according to claim 1, wherein the emergency vehicle includes one or both of an operator actuated siren and operator actuated emergency light, and the method further comprises:
   initiating the computer-implemented method by one or both of the operator actuated siren and emergency light.

4. The computer-implemented method of detecting a vehicle according to claim 1, step B) comprising:
   comparing the determined one or both of the pixel height and the pixel width associated with the license plate to a mapping of a plurality of license plate pixel heights and/or widths with a plurality of respective distances to determine a distance of the detected vehicle in front of the emergency vehicle.

5. The computer-implemented method of detecting a vehicle according to claim 1, step C) comprising:
   determining if the first detected vehicle is one of decreasing in speed and maintaining a substantially constant speed.

6. The computer-implemented method of detecting a vehicle according to claim 1, the first set of two or more video frames including a license plate associated with the first detected vehicle, the license plate including a sequence of characters and a state name and step B) comprising:
   determining if the detected vehicle is within the first prescribed distance by determining a pixel height associated with one of the license plate sequence of characters and state name.

7. The computer-implemented method of detecting a vehicle according to claim 6, step B) comprising:
   comparing the determined pixel height to a mapping of a plurality of license plate character pixel heights associated with a plurality of respective distances to determine a distance of the first detected vehicle in front of the emergency vehicle.

8. The computer-implemented method of detecting a vehicle according to claim 1, step C) comprising:
   determining if the first detected vehicle is one of decreasing in speed, and maintaining a substantially consistent speed.

9. A system that facilitates detecting a vehicle that fails to yield to an emergency vehicle, the system comprising:
   a forward facing image capturing device mounted to an emergency vehicle, the forward facing image capturing device configured to provide a first video stream of an area in a front of the emergency vehicle, the first video stream including a first plurality of temporally spaced video frames;
   a rear facing image capturing device mounted to the emergency vehicle, the rear facing image capturing device configured to provide a second video stream of an area in a rear of the emergency vehicle, the second video stream including a second plurality of temporally spaced video frames;
   one or more processors operatively connected to the forward facing image capturing device and the rear facing image capturing device, the one or more processors configured to execute stored computer-executable instructions for:
   A) receiving a first video stream from the forward facing image capturing device, the first video stream including the first plurality of temporally spaced video frames;
   B) processing the first video stream to identify a first set of two or more video frames including a first detected vehicle within a prescribed distance of road in a front of the emergency vehicle;
   C) processing the identified first set of two or more video frames to determine if the first detected vehicle is yielding to the emergency vehicle compliance according to a first prescribed law, the first prescribed law requiring the first detected vehicle to yield a right of way to the emergency vehicle within the predetermined distance by moving the first detected vehicle to a prescribed side of a section of road and stopping on the prescribed side of the section of road;
   D) receiving a second video stream from a rear facing image capturing device mounted to an emergency vehicle, the second video stream including a second plurality of temporally spaced video frames;
   E) processing the video stream to identify a second set of two or more video frames including a second detected vehicle within a second prescribed distance in a rear of the emergency vehicle; and
   F) processing the identified second set of two or more video frames to determine if the second detected vehicle is following the emergency vehicle in violation of a second prescribed law, the second prescribed law requiring the second detected vehicle to not follow the emergency vehicle at a distance closer than the second prescribed distance in the rear of the emergency vehicle.

10. The system that facilitates detecting a vehicle according to claim 9, the first set of two or more video frames including a license plate associated with the first detected vehicle, the license plate including a height and width, step B) comprising:
    determining if the detected vehicle is within the prescribed distance by determining one or both of a pixel height and a pixel width associated with the license plate.

11. The system that facilitates detecting a vehicle according to claim 10, step B) comprising:
    comparing the determined one or both of the pixel height and the pixel width associated with the license plate to a mapping of a plurality of license plate pixel heights and/or widths with a plurality of respective distances to determine a distance of the first detected vehicle in front of the emergency vehicle.

12. The system that facilitates detecting a vehicle according to claim 10, step C) comprising:
    determining if the first detected vehicle is one of decreasing in speed and maintaining a substantially constant speed.

* * * * *